(12) United States Patent
Cinnamon et al.

(10) Patent No.: US 10,453,223 B2
(45) Date of Patent: *Oct. 22, 2019

(54) GENERATING SYNTHETIC IMAGE DATA

(71) Applicant: Synapse Technology Corporation, Sherman Oaks, CA (US)

(72) Inventors: Ian Cinnamon, Sherman Oaks, CA (US); Bruno Brasil Ferrari Faviero, Coconut Creek, FL (US); Simanta Gautam, Charlottesville, VA (US)

(73) Assignee: Synapse Technology Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,274

(22) Filed: Oct. 31, 2017

(65) Prior Publication Data

US 2019/0057520 A1 Feb. 21, 2019

Related U.S. Application Data

(63) Continuation of application No. 15/727,108, filed on Oct. 6, 2017.
(Continued)

(51) Int. Cl.
*G06T 11/00* (2006.01)
*G06T 9/00* (2006.01)
(Continued)

(52) U.S. Cl.
CPC ............. *G06T 11/003* (2013.01); *G01V 5/00* (2013.01); *G06T 7/12* (2017.01); *G06T 9/002* (2013.01); *G06T 15/503* (2013.01); *G06T 17/30* (2013.01)

(58) Field of Classification Search
CPC ......... G06T 11/003; G06T 7/12; G06T 9/002; G06T 17/30
See application file for complete search history.

(56) References Cited

U.S. PATENT DOCUMENTS

| 5,600,303 A | 2/1997 | Husseiny et al. |
| 6,128,365 A | 10/2000 | Bechwati et al. |

(Continued)

FOREIGN PATENT DOCUMENTS

| CA | 2651131 A1 | 11/2007 |
| CA | 2796809 A1 | 10/2011 |

(Continued)

OTHER PUBLICATIONS

Reed et al, "Generative Adversarial Text to Image Synthesis", Proc. of ICML, 2016.*
(Continued)

*Primary Examiner* — Ruiping Li
(74) *Attorney, Agent, or Firm* — Lee Sullivan Shea & Smith LLP

(57) ABSTRACT

According to an aspect, a method comprises: generating a 2D projection from a 3D representation of an object, wherein the 2D projection comprises an edgemapped projection of the 3D representation, generating, with a generative adversarial neural network (GAN), and based on the edgemapped projection, a simulated image of the object, wherein the simulated image appears as though the object has been scanned by a detection device, combining the simulated image of the object with a background image to form a synthesized image, wherein the background image was captured by a detection device, and outputting the synthesized image.

20 Claims, 6 Drawing Sheets

200

Camera Viewpoint Spherical Coordinates (r, θ ,φ)
204

Related U.S. Application Data

(60) Provisional application No. 62/547,626, filed on Aug. 18, 2017.

(51) Int. Cl.
  *G06T 17/30* (2006.01)
  *G06T 7/12* (2017.01)
  *G01V 5/00* (2006.01)
  *G06T 15/50* (2011.01)

(56) References Cited

U.S. PATENT DOCUMENTS

| | | |
|---|---|---|
| H2110 H | 10/2004 | Newman et al. |
| 6,825,854 B1 | 11/2004 | Beneke et al. |
| 7,277,577 B2 | 10/2007 | Ying et al. |
| 8,014,493 B2 | 9/2011 | Roux et al. |
| 8,494,210 B2 | 7/2013 | Gudmundson et al. |
| 8,633,823 B2 | 1/2014 | Armistead, Jr. et al. |
| 9,042,511 B2 | 5/2015 | Peschmann |
| 9,042,661 B2 | 5/2015 | Pavlovich et al. |
| 9,170,212 B2 | 10/2015 | Bouchard et al. |
| 9,240,046 B2 | 1/2016 | Carrell et al. |
| 2002/0159627 A1 | 10/2002 | Schneiderman et al. |
| 2004/0066966 A1 | 4/2004 | Schneiderman |
| 2006/0088207 A1 | 4/2006 | Schneiderman |
| 2013/0294574 A1 | 11/2013 | Peschmann |
| 2013/0322742 A1 | 12/2013 | Walton et al. |
| 2014/0344533 A1 | 11/2014 | Liu et al. |
| 2016/0117898 A1 | 4/2016 | Kuznetsov et al. |
| 2016/0216398 A1 | 7/2016 | Bendahan et al. |
| 2016/0232689 A1 | 8/2016 | Morton |
| 2017/0061625 A1 | 3/2017 | Estrada et al. |
| 2017/0116511 A1 | 4/2017 | Kim et al. |
| 2017/0316285 A1* | 11/2017 | Ahmed .................. G06K 9/66 |

FOREIGN PATENT DOCUMENTS

| | | |
|---|---|---|
| WO | 2006119603 A1 | 11/2006 |
| WO | 2010050952 A1 | 5/2010 |

OTHER PUBLICATIONS

Isola et al. "Image-to-Image Translation with Conditional Adversarial Networks." Berkeley AI Research (BAIR) Laboratory, University of California, Berkeley, Nov. 21, 2016, 16 pages.

Kalogerakis et al. "A Probabilistic Model for Component-Based Shape Synthesis." Standford University, ACM Transactions on Graphics 31:4, Jul. 2012, 13 pages.

He et al. "Mask R-CNN," Facebook AI Research (FAIR) Apr. 5, 2017, 10 pages.

He et al. "Deep Residual Learning for Image Recognition," Microsoft Research Dec. 10, 2015, 12 pages.

Steitz et al. "Multi-view X-ray R-CNN," Department of Computer Science, TU Darmstadt, Darmstadt, Germany, Oct. 4, 2018, 16 pages.

Girshick et al. "Rich feature hierarchies for accurate object detection and semantic segmentation," Tech report (v5), UC Berkeley, Oct. 22, 2014, 21 pages.

Girschick, Ross "Fast R-CNN," Microsoft Research, Sep. 27, 2015, 9 pages.

Krizhevsky et al. "ImageNet Classification with Deep Convolutional Neural Networks," 9 pages.

Liu et al. "SSD: Single Shot MultiBox Detector," Dec. 29, 2016, 17 pages.

Lin et al. "Focal Loss for Dense Object Detection," Facebook AI Research (FAIR), Feb. 7, 2018, 10 pages.

Lin et al. "Microsoft COCO: Common Objects in Context," Feb. 21, 2015, 15 pages.

Lin et al. "Feature Pyramid Networks for Object Detection," Facebook AI Research (FAIR), Cornell University and Cornell Tech, Apr. 19, 2017, 10 pages.

Lin et al. "Cross-View Image Geolocalization," University of California, Brown University, 8 pages.

Redmon et al. "You Only Look Once: Unified, Real-Time Object Detection," 10 pages.

Ren et al. "Faster R-CNN: Towards Real-Time Object Detection with Region Proposal Networks," Jan. 6, 2016, 14 pages.

Simonyan et al. "Very Deep Convolutional Networks for Large-Scale Image Recognition," Visual Geometry Group, Department of Engineering Science, University of Oxford, Apr. 10, 2015, 14 pages.

* cited by examiner

GENERATING SYNTHETIC IMAGE DATA

PRIORITY CLAIM

This application claims priority to U.S. Provisional Application No. 62/547,626, and is a continuation of U.S. patent Ser. No. 15/727,108, titled "Generating Synthetic Image Data," filed on Aug. 18, 2017 the entirety of which is incorporated herein by reference.

FIELD OF THE DISCLOSURE

The disclosure is generally related to screening security systems for use in public or private applications and, more particularly, to methods, systems, devices, and other elements directed to screening an object.

BACKGROUND

Today, the Transportation Security Administration (TSA) employs tens of thousands airport screeners. A screener's job is to check baggage for security threats prior to boarding a plane. To check whether a piece of baggage is a security threat, the baggage is run through a detection device, such as a scanner, and with the aid of the scanner, the screener flags suspicious pieces of baggage that appear to contain an object that is a security threat. If the baggage is flagged as suspicious, the screener searches to the contents of the piece of baggage by hand to determine whether an object that is a security threat is present in the piece of baggage.

There are a number of issues with the approach of using the two-level of approach of (1) using a baggage scanner to flag suspicious pieces of baggage, and then (2) having a screener search the flagged pieces of baggage. One issue is that currently-utilized scanners may falsely flag many pieces of baggage as suspicious, i.e. resulting in many false positives. False positives, in turn, may cause security screeners to waste time inspecting the baggage incorrectly flagged as suspicious, which may in turn result in a significant waste of money. In addition to incorrectly falsely flagging many pieces of baggage as suspicious, the scanner may also fail to flag significant numbers of pieces of baggage as suspicious when those bags do, in fact, contain objects that are a security risk.

Even more, a screener's job may be both difficult and monotonous. This difficulty and monotonousness may increase the chance that a piece of baggage that is a security threat gets through the screening process without being detected.

BRIEF DESCRIPTION OF THE DRAWINGS

Features, aspects, and advantages of the presently disclosed technology may be better understood with respect to the following description, appended claims, and accompanying drawings where:

Figure 1:
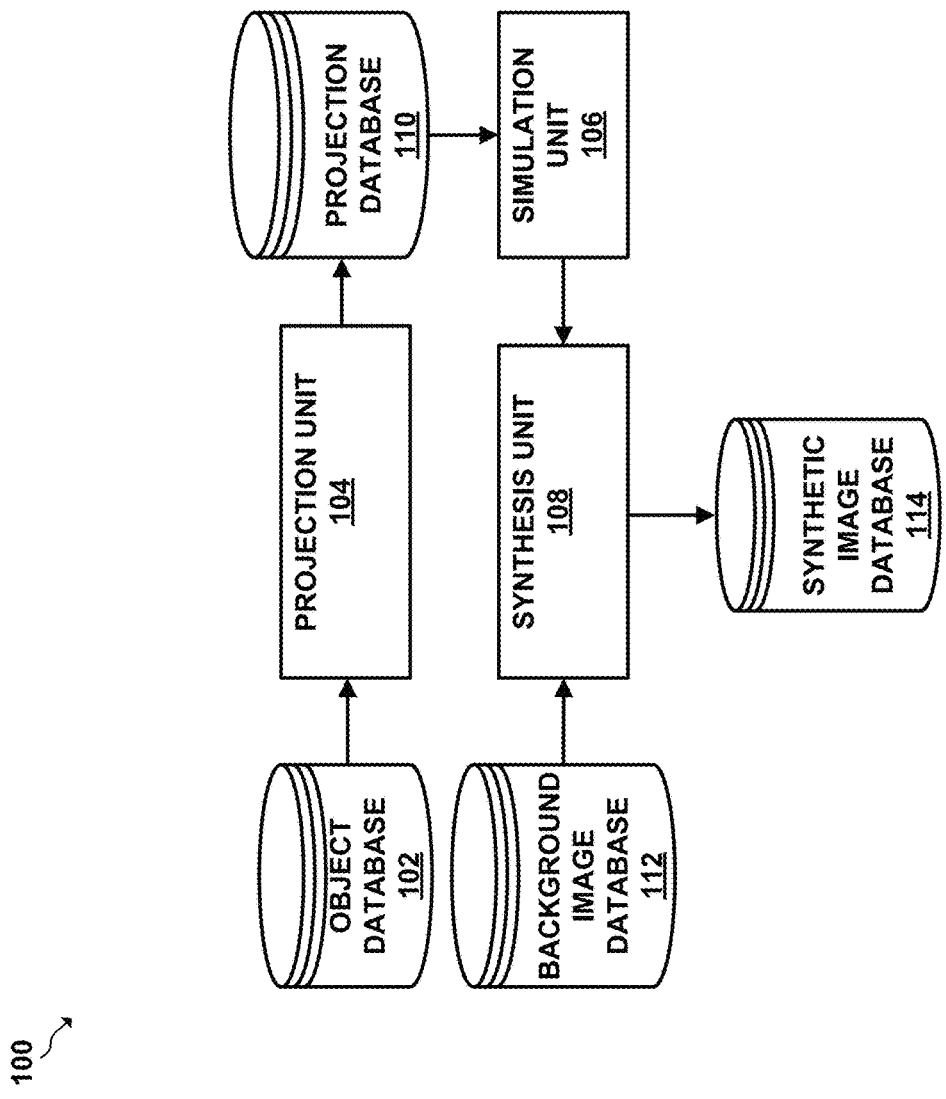
FIG. 1 is a conceptual diagram illustrating an example computer system for generating synthetic data of objects.

The drawings are for illustrating example embodiments, and the inventions are not limited to the arrangements and instrumentality shown in the drawings.

DETAILED DESCRIPTION

I. Overview

Synapse Technology Corporation ("Synapse"), a technology company currently based out of Palo Alto and the assignee of the present application, created a system that greatly modernizes the image intelligence industry with proprietary deep learning and computer vision technology. The system is described in U.S. provisional patent applications 62/532,865 and 62/532,821, both filed on Jul. 14, 2017. Synapse-created technology may be used in the airport security screening process to, among other things, increase accuracy significantly, while avoiding false positives and increasing the throughput of passengers at the checkpoint. The Synapse technology may be used in many other industries, such as those that relate to public and private security and defense.

One technology area where for Synapse's technology may improve throughput relates to scanning of pieces of baggage, e.g. at an airport security checkpoint or another screening location. Currently, in effort to determine whether a screener is paying attention when operating a baggage scanner, a system at an airport, referred to as a Threat Image Projection System, may periodically generate "threat" images of objects that are a security threat on the screen of a baggage scanner. Based on whether the screener identifies the object represented by the threat image, management personnel may determine whether the screener is paying attention.

Additionally, images of objects captured by a scanner may have an altered appearance relative to a standard camera image of those objects. For instance, an object that passes through an X-Ray scanner may have a green translucent appearance. This altered appearance of images generated by the scanner may make objects more difficult to identify or detect. The Threat Image Projection System may be utilized to better-familiarize a screener with the appearance of images of certain objects (e.g. objects that are a threat) captured by a scanner so that the screener may be more able to identify those objects. As an example, images of knives may be presented at a display of a baggage scanner to better familiarize screeners with the appearance of knives.

The Threat Image Projection system may provide useful image data, but at great cost and in a time-inefficient manner. Currently, security personnel may manually place objects into a piece of baggage, and may use a scanner to capture images of those objects. The security personnel may then present the captured images to security personnel, such as screeners, as part of the Threat Image Projection System.

The process of manually placing objects into baggage, scanning the baggage, and capturing image data is laborious, slow, and expensive. The process is expensive in part because (1) only personnel with a certain security clearance may perform the image capturing process, (2) a scanner has to be rented during the capturing process, and (3) each captured image must be manually labeled with a description of that object.

It may be possible to classify objects from images of objects captured by a scanner using computer vision technology. However, computer vision technology is typically inaccurate unless it is trained with a sufficiently large volume and quality of training data. Moreover, there is very little, if non-existent, usable image data available from the airport security sector for objects of interest within baggage, such as images of baggage containing objects that are security threats. Similarly, image data from other security and defense industry sectors is often not available and hard to produce.

The techniques of this disclosure are directed to techniques for generating images of objects that have the appearance of being captured by a scanner such that the generated images can be presented at a scanner's display as part of the Threat Image Projection System described above. Additionally, the generated images may be input to a neural network as part of a set of training data that may be used to train the neural network to classify various objects based on images captured by a scanner.

More particularly, this disclosure describes techniques that may programmatically generate images of objects having the appearance of being scanned by any of various detection devices. Programmatically generating images of objects may bypass the need for manually-intensive scanning of objects to generate captured images of the objects, and labeling the captured images. In turn, the techniques of this disclosure may allow scalable generation of images in such volume and variety that the generated images may be able to train deep learning and other machine learning algorithms to recognize various objects.

Additionally, the programmatic image generation techniques of this disclosure may generate image data with a lower latency than previously-employed techniques, i.e. the time necessary to programmatically generate image data may be less than previously-employed techniques for generating image data. Reducing the image generating latency may enable a system as configured herein to rapidly generate simulated image data for objects constituting new threats that appear, e.g. a new 3D printed gun or explosive caught at a checkpoint. The techniques of this disclosure may provide various other benefits as well.

Various systems, devices, and methods disclosed herein significantly improve the generation of synthetic data representations of various objects. It is to be understood that an "object" as used herein is used to broadly describe any material entity. Examples of an "object," for illustration purposes might include a bag or luggage, purse or backpack, briefcase, box, container or cargo container, wallet, watch, laptop, tablet computer, mobile phone, stroller or wheelchair, a person, and/or any combination thereof. It is also understood that an "object" as used herein may refer to describe any material entity that can be part of, or within, another object. As an example, a shoe, gun, or laptop may all be items located within an object, such as a piece of luggage.

At a high-level, a computer system configured in accordance with this disclosure may comprise a database of 3D representations of various objects for which generating synthetic representations of these objects may be desirable. As described herein, "synthetic data" may refer to a visual representation, such as an image, of a given object that comprises a combination of (1) "real" (e.g. captured) image data obtained from a device, and (2) a simulated image, which may be generated based on non-captured image data, e.g. a simulated image derived from an object model such as a 3D object model.

According to some aspects of this disclosure, a computer system as described herein may generate two-dimensional (2D) simulated images of an object based on 3D representations of those objects. The computer system may generate such simulated images of the objects, and may combine a simulated image of a given object with a background image (e.g. of a piece of baggage) to form a synthetic image. The computer system may generate synthesized images that appear as though the images were generated by a detection device, such as an MM scanner, CT scanner, millimeter wave scanner, X-ray machine, or any other type of scanning system developed in the future. A synthesized image appears as though it has been generated by a detection device despite the object of the simulated image never having been captured by such a detection device. A synthetic image which contains a simulated image of an object generated may approximate a captured image with high enough accuracy to be used for various purposes as described herein.

Additional details regarding the design an operation of the computer system of this disclosure will now be described. The computer system of this disclosure stores representations of various objects in a data store. A representation of an object may comprise a 3D representation such as a polygonal model or a set of 2D slices that combine to form a digital representation of the object. The computer system may store the representations in a datastore, such as a database, which may be referred to as an object database.

A projection of the computer system unit may access a representation of a given object from the database, and may generate one or more 2D images, referred to as projections, of the given object based on the accessed representation. To generate a given projection, the projection unit may determine a position for a virtual camera at a given point in a 3D space centered around the representation of the given object. The projection unit may use a projection technique to convert the 3D representation to a 2D at the given point. Responsive to generating the 2D representation, the projection unit may perform various image processing techniques on the generated 2D representation to generate a projection. One such type of image processing technique that the projection may perform is edgemapping. Edgemapping is a process that takes an inputted image of an object that contains detail such as color and texture, and outputs an edgemapped image consisting solely of edges of that object and lacking the detail such as texture, color and various other details.

After generating the given projection, the projection unit may output the projection along with any associated metadata to a datastore such as a database, which may be referred to as a projection database. The database may store projection images along with any associated metadata, which may contain information such as the name or type of the object which is represented by the projection.

Other projections can be made from 3-dimensional data through one of many techniques that can reduce the higher-dimensional data to a 2-dimensional spatial model. In one instance, a "slice" of the 3D model can be taken to generate a 2-dimensional plane within the 3D model. In another instance, multiple slices may be combined to generate a 2D model that represents both an item's external shape and the content within. For example, a 2D representation of a retractable utility knife could contain the shape of the razor blade within superimposed on the projection of the casing.

In another implementation, an object representation from which a projection is formed may comprise purely 2D forms such as one or more a photos or other images of an object. The object representation may take various other forms as well.

Such a projection is not limited to two spatial dimensions, but can also contain additional data that may take various forms. As one example, such per-pixel data may include spectral band data and/or material characteristics (z-effective value, atomic number, density). The additional data may take various other forms as well.

After storing the projection image (also referred to as the "target" image) in the projection database, a simulation unit inputs projection image into a generative adversarial network (GAN) to generate a simulated output image. The GAN is a type of neural network that generates a simulated output image based on a type of input image. In this disclosure, based on an input projection image of a given object, the GAN may generate an image representation of the given object, referred to as a simulated image. The simulated image may simulate the appearance of the object if the object had been scanned by a given detection device. More particularly, the GAN of the simulation unit adds color and texture to the edgemapped projection image to generate the simulated image of the object having the appearance of being scanned by the given detection device. The simulation unit outputs a simulated image to an overlay generator after the simulated image is generated.

In another embodiment of this invention, the simulated image may be generated based on the application of various variations to the projection image. Such variations may take various forms such as changing rotation, changing lighting, and/or obscuring part of the projection image. The variations to the simulated image may take various other forms as well.

The overlay generator inputs a simulated scanned image from the simulation unit and a real image (also referred to as a "background image") captured by a detection device, and combines the real image and the simulated image of the object to form a combined image that includes the background image and the simulated image of the given object. After the combined image has been generated, the overlay generator may store the combined image to a synthetic image database.

In some implementations, the background image may comprise a background image of a bag that was previously scanned. In some implementations, the background image may itself be simulated in part or in whole. For example, the simulation of the entire background image may encompass generating a 3-dimensional model of each item inside of an object and manipulating it in a manner similar to the manipulation of the target object.

Further transformations to the synthetic image may be applied in the context of the background image, including manipulating the synthetic image to better match the background image, overlapping the synthetic image with certain objects in the real image, etc.

In one aspect of this disclosure involves a method. The method may comprise: generating a 2D projection from a 3D representation of an object, generating, based on the 2D projection, a simulated image of the object, wherein the simulated image appears as though the object has been scanned by a detection device, combining the simulated image of the object with a background image to form a synthesized image, wherein the background image was captured by a detection device, and outputting the synthesized image.

Another aspect of this disclosure involves a system comprising a memory and at least one processor, the at least one processor to: generate a 2D projection from a 3D representation of an object, generate, based on the 2D projection, a simulated image of the object, wherein the simulated image appears as though the object has been scanned by a detection device, combine the simulated object with a background image to form a synthesized image, wherein the background image was captured by a detection device, and output the synthesized image.

Yet another aspect of this disclosure involves a non-transitory computer-readable storage medium comprising instructions stored thereon that, when executed, cause at least one processor to: generate a 2D projection from a 3D representation of an object, generate, based on the 2D projection, a simulated image of the object, wherein the simulated image appears as though the object has been scanned by a detection device, combine the simulated object with a background image to form a synthesized image, wherein the background image was captured by a detection device, and output the synthesized image.

Various other aspects of this disclosure may take various other forms as well.

II. System Overview

FIG. 1 is a conceptual diagram illustrating an example computer system for generating synthetic image data of objects. FIG. 1 illustrates a computer system 100. Computer system 100 may comprise an object database 102, a projection unit 104, a simulation unit 106, a synthesis unit 108, a projection database 110, a background image database 112, and a synthetic image database 114.

A. Object Database

In an implementation, object database 102 may comprise a database that stores visual representations of various objects. In an implementation, Object database 102 may take a query as input, may process the query, and may output an object representation based on the inputted query. More particularly, object database 102 may be indexed using a key identifier for a given object within 102. In various examples, object database 102 may be queried using a query language such as JSON, SQL or various other query languages. Object database 102 may be queried in various other manners as well. In another implementation, object database 102 may comprise a data store other than a database such as a flat file. Object database 102 may take various other forms as well.

Object database 102 may store a visual representation of an object in various formats. As examples, a visual representation may comprise a 3D model, a set of 2D slices of an object or various other forms as well. Such 3D modeling formats may comprise: OBJ, STL, DFX, and Blender formats, as some non-limiting examples. An object may be represented in various formats as well.

In an implementation, a representation of a given object may be comprised of sets of connected vertices of various polygons. Each vertex may be defined by a set of coordinates such as Cartesian coordinates, polar coordinates, spherical coordinates, or the like. These sets of connected vertices may be combined to form higher-level surfaces, which contain additional detail. In some implementations, a given object representation may have associated texture data. The texture data defines color information (e.g. in pixel format), and/or transparency for a given set of polygons of the visual representation.

In other implementations, a given object representation may be represented as a series of voxels or other multi-dimensional graphical elements.

In still other implementations, an object representation may be formed from 3-dimensional data through one of many techniques that can reduce the higher-dimensional data to a 2-dimensional spatial model. In one instance, a "slice" of the 3D model can be taken to generate a 2-dimensional plane within the 3D model. In another instance, multiple slices may be combined to generate a 2D model that represents both an item's external shape and the content within. For example, a 2D representation of a retractable utility knife could contain the shape of the razor blade within superimposed on the projection of the casing.

In yet another implementation, an object representation from which a projection is formed may comprise purely 2D forms such as one or more a photos or other images of an object. The object representation may take various other forms as well.

The representations stored in object database 102 may be obtained in various different manners. As one example, object representation data may be obtained from a government agency, such as the TSA or from a manufacturer, such as a laptop manufacturer. As another example, object representation data may be obtained from scanning devices, such as 3D scanners. As yet another example, the object representations may be obtained from publicly available sources such as Internet sources, e.g. by using a crawling program or various other techniques. The object representations may be obtained using various other techniques as well.

B. Projection Unit

Projection unit 104 may comprise software, hardware, firmware, an FPGA (field-programmable gate array), CPU, GPU, ASIC, or any combination thereof that may be configured to generate a 2D projection image based on an object representation. To generate a 2D projection image of a given object, projection unit 104 load a given object representation from object database 102 and may generate a 3D space containing the representation of the given object.

More particularly, projection unit 104 may generate a representation of a given object in a 3D space through the perspective a virtual camera. Projection unit 104 may allow control over the location of the camera along various degrees of freedom, e.g. yaw, pitch, translation, etc. Projection unit 104 may also generate and apply various effects such as lighting effects, which may include positioning of lighting sources within the 3D space containing the representation of the object. In an implementation, projection unit 104 may use various software rendering libraries to generate the 3D space, to position the virtual camera. The python-stl library is one such example library. Projection unit 104 may use various other libraries as well. These rendering libraries may also enable various other interactions with, and application of effects to an object representation as well.

Responsive to receiving an inputted object representation, projection unit 104 generates a 3D coordinate space containing the object representation. Projection unit 104 then determines a centroid of the object representation. The centroid as described herein may be defined as a point around which the 3D coordinate space for a given object representation is centered, as a fixed center point around which one or more camera viewpoints are positioned, or as a center point of a given object representation. A centroid may take various other forms as well.

In one example, projection unit 104 may circumscribe a sphere around the object representation, and may define the centroid as the center of the sphere. As another example, projection unit 104 may define the centroid by: (1) finding a longest span of a given object representation, wherein the span comprises a line segment (2) determining the center of the line segment, (3) defining the center of the line segment as the centroid of the given object.

Projection unit 104 may define the positions of the centroid and the camera viewpoint as respective sets of coordinates in a 3D coordinate space, such as a spherical coordinate space, as one example. A spherical coordinate space may be such a coordinate space in one example. Such a spherical coordinate space is defined by the values: (r, θ, φ), where r is a radial distance, θ is a polar angle, and φ is a zenith angle.

In one implementation, the camera viewpoints may be defined as a set of points at a uniform distance around the centroid of the given object representation, wherein each point of the set of points is defined by a set of spherical coordinates. In some examples, the camera viewpoints may be defined at a minimum distance (i.e. a minimum radius) away from the centroid in the 3D space. In these examples, the minimum distance of the camera viewpoints away from the centroid may be defined as half the length of the segment defined by the longest span of the object representation. The camera viewpoints may be defined at various other distances and in various other manners as well.

Based on the coordinates of the camera viewpoint and the centroid, projection unit 104 may determine a 2D projection of the object representation. Responsive to determining the centroid's coordinates, projection unit 104 may convert the spherical coordinates of the camera viewpoint to Cartesian coordinates. To convert the viewpoint's spherical coordinates to Cartesian coordinates, projection unit 104 may utilize the following conversion equations to generate Cartesian coordinates denoted as x, y, and z:

$$x = r \sin \varphi \cos \theta$$

$$y = r \sin \varphi \cos \theta$$

$$z = r \cos \varphi$$

In an implementation projection unit 104 may utilize various optimization techniques to speed the computation of the conversion between spherical and Cartesian coordinates. Examples of such optimizations may involve vector processing, transformation matrices, lookup tables or various other optimization techniques.

After the viewpoint coordinates have been converted to three-dimensional Cartesian coordinates, projection unit 104 may convert the three-dimensional Cartesian coordinates to a set of projected 2D Cartesian (i.e. x, y) coordinates. To convert the three-dimensional coordinates to a set of 2D Cartesian coordinates, projection unit 104 may apply a projective equation at each 3D coordinate of the object. In an implementation, projection unit 104 may use a perspective projection matrix that performs the projection equations on a matrix representation of a 3D object.

Responsive to generating the 2D Cartesian coordinates, projection unit 104 may convert the 2D Cartesian coordinates to a set of pixel coordinates represented by a pair of variables u and v, where u is a downward horizontal distance relative to an origin in a top-left corner of an image, and v is a vertical distance from the origin, wherein u and v are restricted to the set of positive real integers. Generally, projection unit 104 may shift the origin of and apply an affine transformation (e.g. a translation, etc.) to go from x,y coordinates to u,v coordinates.

The result of projecting the camera viewpoint to the pixel coordinate space is a 2D pixel representation of the given object at the given camera viewpoint.

In an implementation, projection unit 104 may determine a set of camera viewpoints, and may iteratively generate a set of 2D projections for each viewpoint in the set of viewpoints. Projection unit 104 may determine the spherical coordinates for each of the different camera viewpoints from a predefined list, which contains spherical coordinates for each of the camera viewpoints.

In one implementation, the list of different viewpoints coordinates may be the same for every object. In another implementation, the camera viewpoints may be different for each object. As an example, the list of camera viewpoints may differ such that the camera viewpoints capture certain areas of interest of various objects, as one example. For instance, for a handgun object, the camera viewpoints may be generated such that certain components of the handgun, e.g. the stock, barrel, etc., are visible in 2D projections generated from at least some of the camera viewpoints. In another instance, the list of spherical coordinates may comprise a set of viewpoints that include certain angles, e.g. non-standard angles of a given object such as a down-the-barrel-viewpoint of a gun or along a narrow dimension of a laptop. The list of camera viewpoint coordinates may be defined and may differ in various other manners as well.

In an implementation, responsive to selecting a list of camera viewpoints defined by corresponding sets of spherical coordinates, projection unit 104 may iteratively: (1) select a given viewpoint from the list, (2) convert the coordinates of the given viewpoint from a spherical coordinate system to a Cartesian 3D coordinate system, and (3) generate a 2D protection of the object representation at that viewpoint. Projection unit 104 may continue to generate 2D viewpoints until projection unit 104 has generated a 2D image of the object at point defined by each set of spherical coordinates in the list.

In an implementation, the list of camera viewpoints may comprise n sets of spherical coordinates, where n is any number, and each set of spherical viewpoints corresponds to a camera viewpoint. In an implementation, n may be 256 entries. The list of camera viewpoints may comprise various other numbers of camera viewpoints as well.

Figure 2:
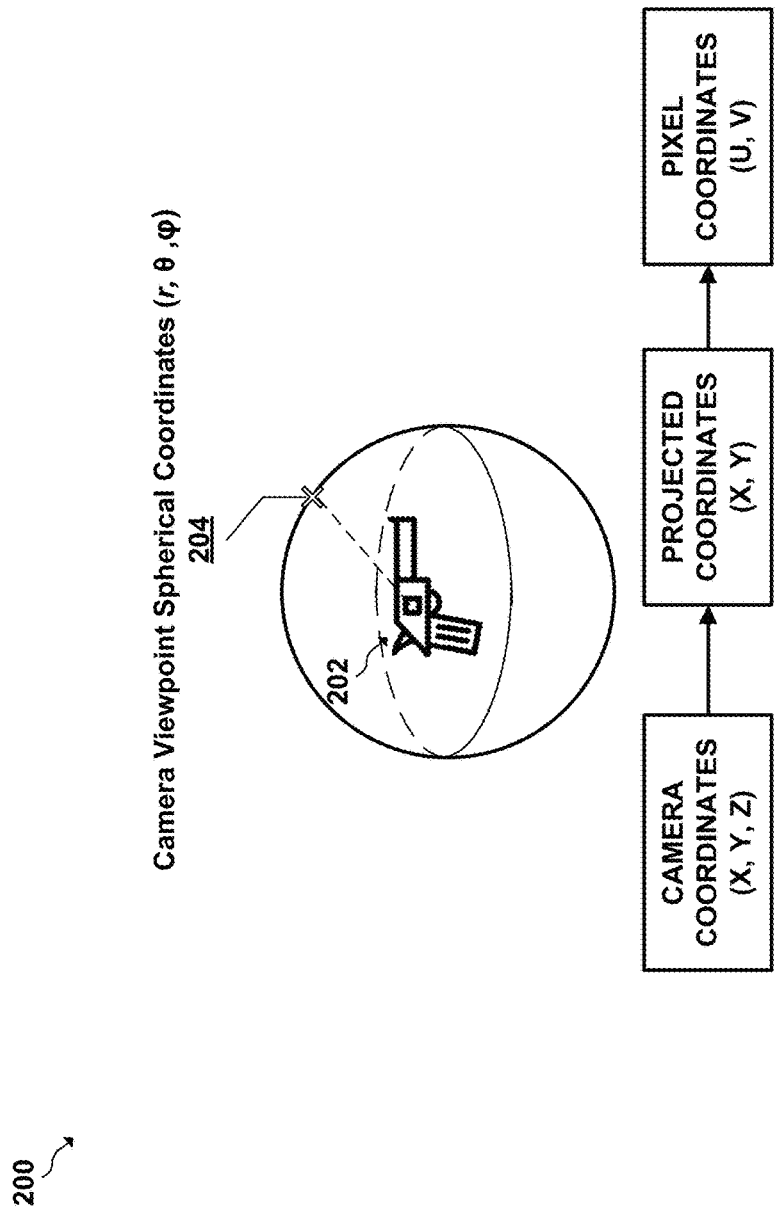
FIG. 2 is a conceptual diagram illustrating a projection of an object from a 3D representation to a 2D representation.

Turning now to FIG. 2, an example conceptual diagram of projecting an object from a 3D representation to a 2D representation is illustrated. In the example of FIG. 2, a 3D model 202 of an object is illustrated. 3D model 202 is positioned within a spherical coordinate space. The spherical coordinate space is represented by the tuple of numbers: $(r,\theta,\varphi)$, where r is a distance from the origin, $\theta$ is the polar angle, and $\varphi$ is an azimuth angle. The center of the polar coordinate space (e.g. corresponding to coordinates (0,0,0) may be a centroid of 3D model 202 in various implementations.

Also positioned within the polar coordinate space is a camera viewpoint 204. Camera viewpoint 204 is positioned at some point $(r,\theta,\varphi)$. As illustrated in FIG. 2, projection unit 204 may convert the camera viewpoint spherical coordinates to 3D cartesian coordinates (x, y, z), and may perform projection to convert the an image of 3D model 202 viewed from camera viewpoint 204 to a set of projected 2D (x,y) coordinates, and may further convert the set of 2D Cartesian coordinates to a set of 2D pixel coordinates (u,v). Additional details regarding the process of projecting a 3D image to a 2D image will now be described with respect to FIG. 3.

Figure 3:
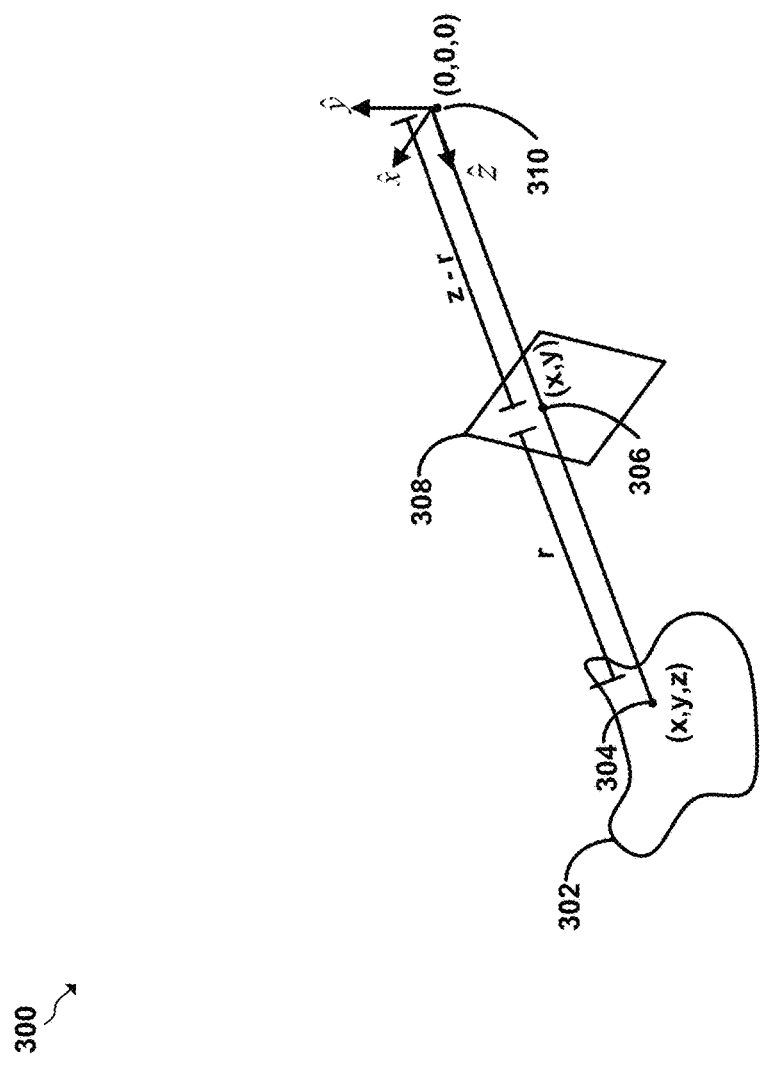
FIG. 3 is another example of a conceptual diagram illustrating a projection of an object from a 3D representation to a 2D representation.

Turning now to FIG. 3, a conceptual diagram 300 illustrating a projection of an object from a 3D representation to a 2D representation. In the example of FIG. 3, a 3D model 302 is illustrated. 3D model 302 consists of a set of points, one of which is point 304, which is located at a point (x,y,z) located in a 3D cartesian space.

In this example of FIG. 3, a projection unit (e.g. projection unit 104 of FIG. 1) may attempt to project point 304 onto some 2D point 306 of a 2D surface 308. 2D surface 308 may be located at some distance r from 3D point 304, and distance z-r from an origin 310 of the 3D space. projection unit 104 may use the following equations to project point 304 to point 306, i.e. to determine the x-coordinates on 2D surface 308:

$$x = (z-r) * \frac{x}{z}$$
$$y = (z-r) * \frac{y}{z}$$

After generating the a given 2D image projection, projection unit 104 may use an edgemapping technique to generate an edgemapped image of the given object based on the 2D image projection. Projection unit 104 may perform the edgemapping in various manners. In one example, projection unit 104 may apply a Sobel filter to a given 2D image projection to generate an edgemapped image of the given object. Projection unit 104 may use various other edge detection techniques (e.g. algorithms) to generate an edgemapped image as well.

Projection unit 104 may also generate associated metadata for each given projection image. Examples of such metadata may comprise a name or class of an object represented in the projection or edgemapped projection as an example. In some examples, the metadata may comprise a dictionary comprising a set of attributes. The metadata may take various other forms as well.

Responsive to generating the edgemapped projection image, projection unit 104 may output the edgemapped projection image.

C. Projection Database

In an implementation, projection unit 104 may output each edgemapped image, and associated metadata to a projection database 110. Projection database 110 may comprise a database or datastore that may store projection images (e.g. edgemapped projection images) and any associated metadata. In an implementation, projection database 110 may be queried using various query languages and indexed using a key identifier. In various examples, projection database 110 may be queried using a query language such as JSON, SQL or various other query languages.

Responsive to receiving a query containing a key corresponding to a given edgemapped projection image, projection database 110 may output the corresponding edgemapped projection image and any associated metadata. Projection database 110 may comprise various other data stores, such as flat files, as well.

D. Simulation Unit

Simulation unit 106 may generate a simulated image based on an inputted edgemapped projection image. Simulation unit 106 may access projection database 110 to obtain a given edgemapped projection image, and may input the given edgemapped projection image into a neural network to generate a simulated image of a given object that may appear as though the given object has passed through a given detection device. As examples, a simulated image of an object may appear as though the object had passed through and had been scanned by a detection device, such as an X-ray scanner, CT scanner, or the like.

As an example, simulation unit 106 may receive an edgemapped projection image of a knife as input. Simulation unit 106 may apply various operations on the edgemapped projection image to generate a simulated image of the knife having the appearance of being scanned by a detection device, such as a multi-spectral X-ray scanner.

In an implementation, simulation unit 106 may comprise a set of neural networks that may generate a simulated image from an input image, e.g. an edgemapped projection image. Responsive to receiving an input edgemapped projection image of a given object, simulation unit 106 may determine an object associated with the edgemapped projection image, e.g. based on the edgemapped projection image's associated metadata. Based on the determined object, simulation unit 106 may select a given neural network to generate a simulated image of the given object.

As an example, simulation unit 106 may receive an edgemapped image of an object, which may be categorized as a "sharps" object. Such sharps object may comprise knives or other objects that have sharp edges. Based on the determined sharps object, simulation unit 106 may select a neural network to use to generate a simulated image of the sharps object.

In an implementation, simulation unit 106 may select the neural network that is likely to generate the most accurate simulated image for the given input image. For instance, for an input edgemapped projection image of a sharps object, simulation unit 106 may select a neural network that may be configured to generate simulated images of sharps objects, knives, of objects having blades, etc.

In an implementation, before inputting the edgemapped image into the selected neural network, simulation unit 106 may resize (e.g. downsample) the inputted edgemapped image to dimensions 256×256×1, where 256×256 are the length and width respectively, and where "1" is the number of color channels. After resizing the edgemapped image, simulation unit 106 may output the downsampled edgemapped image into the selected neural network.

At a high level, the selected neural network comprises a series of layers. The selected neural network inputs the downsampled edgemapped image the series of layers, each of which apply mathematical operations to the output of the previous layer, and finally outputs a simulated image of the given object.

Figure 4:
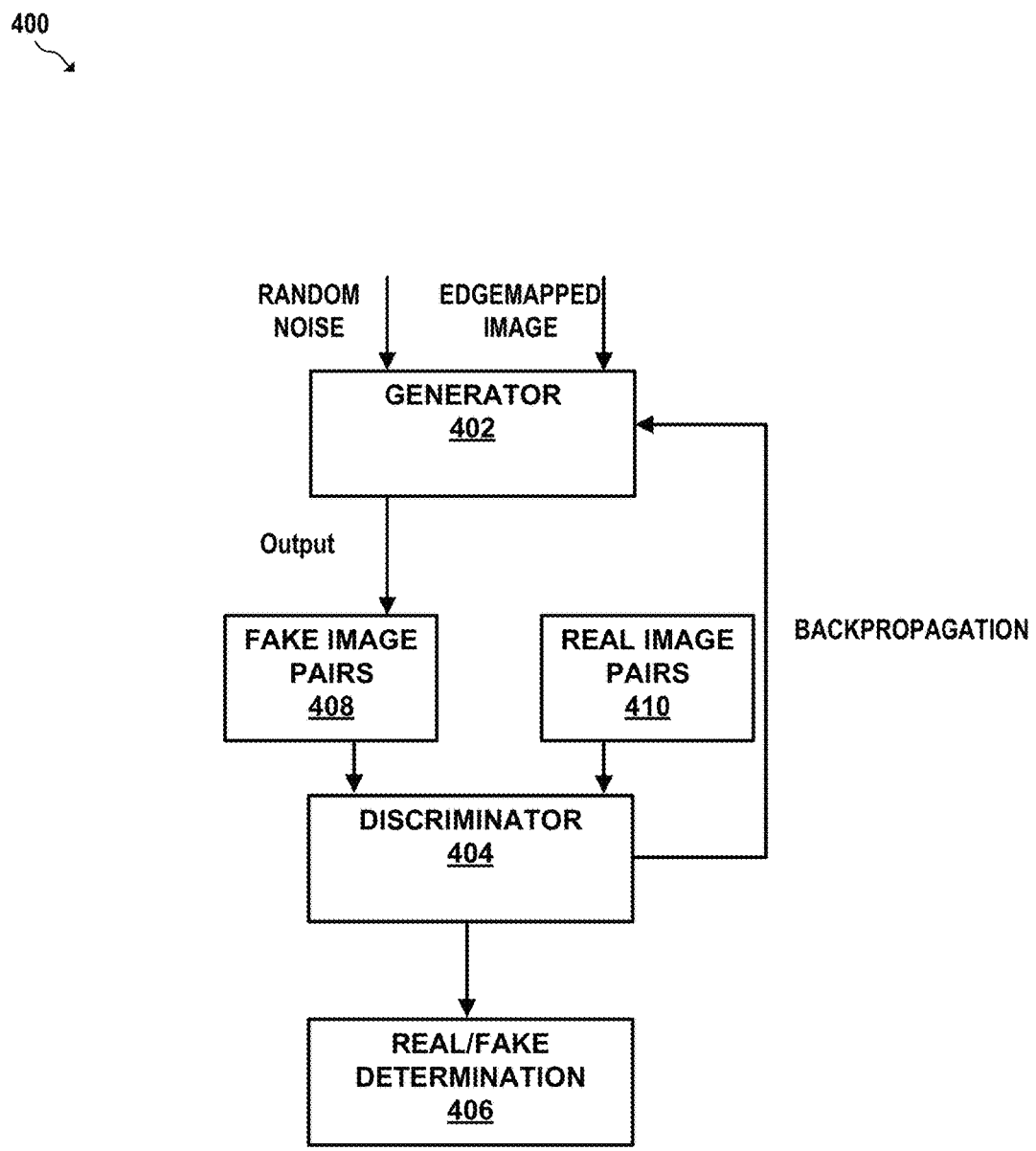
FIG. 4 is a conceptual diagram illustrating an example operation of a generative adversarial network in accordance with implementations of this disclosure.

In an implementation, the selected neural network may comprise a Generative Adversarial Network (GAN). Turning now to FIG. 4, a system 400 is illustrated comprising an example generative adversarial network. System 400 comprises a generator 402, and a discriminator 404. The GAN of FIG. 4 is a neural network comprised of two neural networks: (1) a discriminator neural network 404, and (2) a generator neural network 402.

Discriminator 404 is a neural network that attempts to determine whether images that are input to the discriminator neural network are "real" or "fake." Discriminator 404 is trained based on pairs of training data images that are specified as either "real" (real image pairs 410) or "fake" (fake image pairs 408). Discriminator 404 generates a determination of whether the discriminator neural network thinks the pair of images is real or fake (real/fake determination 406). Based on each pair image, discriminator 404 "learns" features that distinguish real and fake images.

After analyzing each image, discriminator 404 may update the discriminator neural network's parameters to minimize an error function. The error function may be based on whether the discriminator neural network correctly identifies a given image as being real or fake. The discriminator neural network may update the discriminator neural network's parameters using techniques such as gradient ascent/descent, which is an iterative optimization technique. The discriminator neural network may utilize various other error minimization techniques as well.

Generator 402 comprises a network that attempts to generate images that the discriminator believes are real. At a high level, generator 402 inputs an image, and attempts to generate a simulated output image that resembles a given class of output with high enough accuracy to fool the discriminator into thinking that the simulated output image is real when in fact it was generated artificially, i.e. the output image is not a captured image.

Generator 402 and discriminator 404 are trained in an adversarial and alternating fashion. The discriminator inputs training images comprising real or fake pairs of edgemapped images of a given object, and based on whether or not discriminator neural network 404 accurately predicts whether the given pair of images is real or fake, updates the parameters of discriminator 404. Additionally, discriminator 404 uses backpropagation to convey gradient information to generator 402 so that generator 402 can use the gradient information to update its parameters to be better able to fool discriminator 404.

Generator 402 takes in an input image and adds in some random noise, and generates a fake simulated output image. In an implementation. The random noise may comprise Gaussian noise, referred to as "z" so that generator 402 generates slightly different output regardless of whether input is the same, i.e. to ensure generator 402 operates in a non-deterministic manner. In an implementation, other techniques may be used to ensure that generator 402 operates in a non-deterministic fashion (i.e. to ensure stochasticity") than conditioning generator 402 on Gaussian noise z. For example, a dropout layer can be used, which randomly selects nodes to be perturbed within generator 402's neural networks.

Based on the backpropagation information received from the discriminator, generator 402 updates the parameters of its neural network to generate simulated output that more closely approximates real output, thereby fooling the discriminator more frequently. Generator 402 and discriminator 404 may be trained in an alternating fashion in which the discriminator attempts to distinguish an image and backpropagates gradient information, and then the generator generates a new fake image that attempts to fool the discriminator. This alternating training process may continue until the generator generates images that fool the discriminator with a given frequency. Once generator 402 and discriminator 404 have been sufficiently trained, the generator can be used to generate simulated images based on inputted images, and the discriminator is no longer used.

A more mathematically-detailed description of the operation of a generator and a discriminator (e.g. generator 402 and discriminator 404) will now be discussed. As discussed above, a GAN comprises two convolutional neural network models, a discriminator and a generator, which are trained on opposing objective functions.

The discriminator is given paired images, referred to as X and Y or Y'. In an implementation, X can may comprise an edgemapped image, Y may comprise a corresponding scanned image (such as an X-ray) image of that edgemap, and Y' may comprise an image generated by some generator G. From the images X, Y, and Y' the discriminator (referred to as "D") is trained to discriminate between real image data (referred to as Y) and simulated image data (referred to as Y').

The generator G is trained to simulate data (Y') given an input image X and some gaussian noise z. Gaussian noise is may be added so that G (which can be thought of as a function that maps $(X, z) \rightarrow Y'$) is non-deterministic. That is, the mapping will be conditioned on random noise z so it produces a slightly different Y' every time. Producing slightly different output images may be useful because there may be multiple ways to simulate data while still preserving certain semantics and because generating varied output images may be desirable for various reasons. It should also be noted that there may be other ways to ensure that G is non-deterministic (to 'ensure stochasticity') other than conditioning on a Gaussian noise z. For example, noise can be introduced in a dropout layer, in which nodes are randomly selected to be perturbed within the neural network of the generator, G.

As described above, the objective of generator G is to fool the discriminator D, by trying to simulate image data that is as realistic as possible to ensure the discriminator does not do well in satisfying its objective. In addition, an L1 loss (least absolute deviations) may be added to the generator to ensure that L1 distance of the generator's simulated output to the ground truth output is minimized. As described above, the objective of the discriminator, D, is to minimize the log-loss of the mistakes made in differentiating real and simulated image data.

As the generator and discriminator are iteratively trained (using stochastic gradient descent) with opposing objectives, both the generator and discriminator get progressively better. After sufficient training, the generator is able to generate realistic simulated images conditioned on an input.

The process of determining weights for the generator and discriminator neural networks will now be discussed in greater detail. If $\theta_D$ and $\theta_G$ are the weights of the discriminator and generator neural network, respectively, the discriminator may be trained or may "learn" based on the following gradient:

$$\nabla_{\theta_D}[\log D(\partial)+\log(1-D(G(X,z))],$$

and the generator may be trained or may learn based on the following gradient:

$$\nabla_{\theta_G}[\log(1-D(G(X,z))].$$

Based on the above-two gradient equations, the optimal generator, denoted as G* can be determined according to the following equation:

$$G^* = \arg \min_G \{\max_D \{[\log D(Y) + \log(1 - D(G(X, Z)))]\}\}.$$

System 400 may attempt to determine the optimal generator G* using gradient and/or descent, as some examples.

In an implementation, the neural network of generator 402 may comprise an encoder-decoder architecture. An encoder-decoder architecture is a neural network comprising encoding layers and decoding layers. Encoding layers attempt to reduce the dimensionality of an input image, thereby generating a lower-dimensional representation of the input image. Decoding layers perform an inverse process, and attempt to construct a higher-dimensional representation that maps the lower-dimensional representation generated by the encoder back to an image-dimensional representation having sufficient dimension to be displayed as an image.

More particularly, the encoding layers comprise a series of convolutional layers and pooling layer that perform convolution and downsampling, respectively. By performing convolution and downsampling, an encoder may reduce the dimensionality of an input image, thereby generating a lower-dimensional feature map of the input image. Conversely, a decoder may take the lower-dimensional representation of an image generated by an encoder, and may perform convolution and upsampling to generate a higher-dimensional representation of the image.

A given convolutional layer may receive a set of neighboring input values (e.g. a feature map or a set of pixels) for processing, may apply a set of matrices referred to as "kernels" to the set of input values to generate a representation of the features identified from that set of input values, referred to as a feature map. Each convolutional layer may have a different associated set of kernels.

To apply a given kernel, a convolutional layer performs a technique referred to as convolution, which takes a set of neighboring input values, which may comprise neighboring pixels or neighboring values of a feature map, and expresses a given value from the set as a weighted sum of the value and its neighboring values in which the weights for each input value are defined by the elements of the kernel matrices. The output of a convolutional layer is referred to as a "feature map" because the output contains information about features detected by the convolutional layer.

A pooling layer may input a set of neighboring values, and selectively downsample the input values, e.g. pixels or values of a feature map. More particularly, the pooling layer may determine a set of regions and may apply a pooling function, each of the regions, and may apply a function, such as a max-pool function, to each region. The max-pool function may identify a maximum value from a given region, retain the maximum value, and may discard all other values in the region. A pooling layer may apply various other functions to input values as well.

Figure 5:
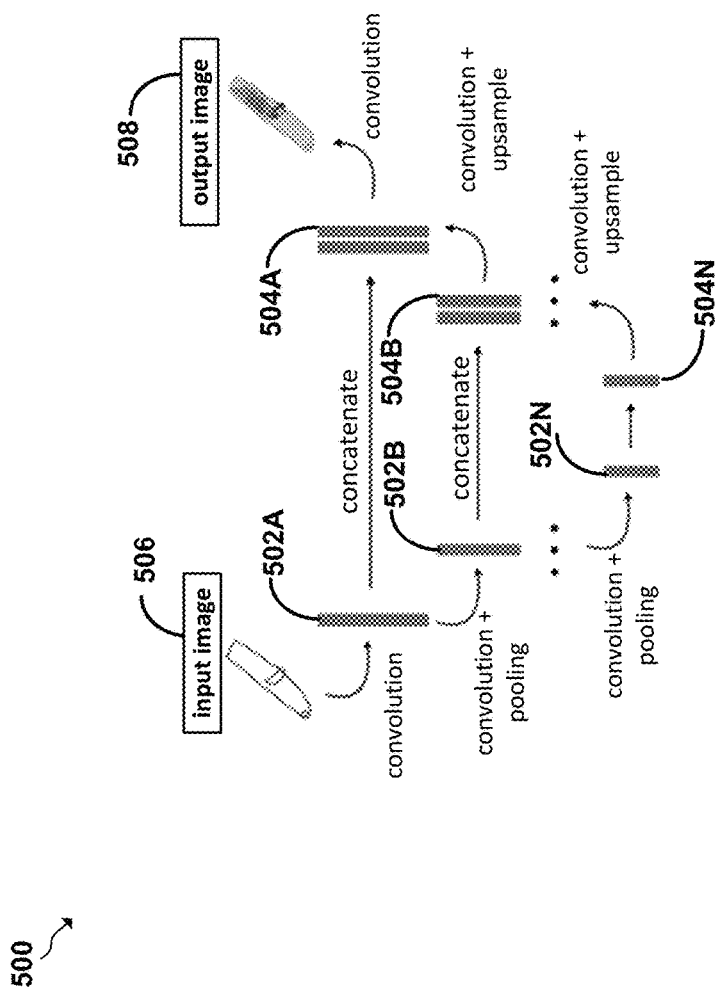
FIG. 5 is a conceptual diagram illustrating an example encoder-decoder generator architecture.

Turning now to FIG. 5, a conceptual diagram of an encoder-decoder architecture is illustrated. The example of FIG. 5 illustrates an encoder-decoder architecture for a given class of object, e.g. a "sharps" object. The encoder-decoder network 500 illustrated in FIG. 5 may comprise a neural network of a generator, e.g. generator 402 of FIG. 4 as an example.

In the example of FIG. 5, network 500 takes an edge-mapped image 506 as input, passes the input image 506 through a series of encoder layers 502A-N, and a set of decoder layers 504A-504N to generate simulated output image 508. In the example of FIG. 5, input image 506 is an edgemapped image of a knife, and output image 508 is a simulated image of that knife which appears as though it has passed through a detection device, such as an X-ray scanner.

As described above, encoder layers 502A-502N may perform convolution and/or pooling operations. Each encoder layer, which may be comprised of multiple kernels (e.g. convolution, dropout, upsampling, etc.), may output a feature map to a subsequent convolution layer. Additionally, in an implementation, each encoder layer may output a feature map to a corresponding decoder layer, which is a technique referred to as a "skip layer" due to the fact that the output from the encoder layer skips intermediary encoder and decoder layers.

In the example of FIG. 5, convolution layer 502A outputs to both encoder layer 502B and to decoder layer 504B (an example of such a skip layer). Each encoder layer generates feature map until encoder layer 502N generates a feature map, which is outputted to decoder layer 504N.

Each of the decoder layers 504A-504N perform generally reciprocal operations relative to the encoder layers. Such reciprocal operations may comprise deconvolution, upsampling, and various other operations as well. The decoder layers output in reverse order relative to the encoder layers, e.g. decoder layer 504B outputs to decoder layer 504A, etc.

The decoder layers may also receive input from corresponding encoder layers as part of a skipping process.

In addition to parameters such as kernel weights, pooling functions, and various other parameters, neural networks may also have higher-level hyperparameters, which may define the operation of these neural networks. Such hyperparameters may define learning rate, numbers of layers, numbers of feature maps, etc. The hyperparameters for an encoder-decoder architecture may be defined in various manners.

In one implementation, the architecture hyperparameters for an encoder as described in this disclosure (as described by the number of feature maps in each layer) may be: 64-128-256-512-512-512-512-512, where 64 is a number of features maps for a first encoder layer, and 512 is a number of feature maps for the last-in-sequence encoder layer. In another implementation, the architecture hyperparameters for the decoder may be 512-1024-1024-1024-1024-512-256-128, where 512 is a number of feature maps for the first-in-sequence decoder layer, and 128 is a number of feature maps for a last-in-sequence decoder layer. The hyperparameters may be defined using various other values as well.

E. Background Image Database

In an implementation, background image database 112 comprises a database of images scanned by one or more detection devices. Detection devices may comprise one or more detection devices that capture images of objects such as baggage items, clothing, human beings, and the like. Example detection devices may comprise x-ray scanners, MRI scanners, CT scanners, spectral band scanners, millimeter wave scanners, or any other scanning device now or later devised. Other manners of detection devices are also possible. The images captured by detection devices may represent the captured data using various representations. As examples, the background images may be represented using pixels, voxels, polygons, or elements that may generally be used to construct image data.

In some examples, the background images stored in background image database 112 captured by detection devices may be captured in a DICOS ("Digital Imaging and Communication for Security" standard published by the National Electrical Manufacturers Association) format. The background images may contain metadata, which may comprise information related to material density, geometric dimensions, and/or atomic numbers of various regions or graphical elements in a background image, as some non-limiting examples. It should be understood that image data may be captured in other formats and the metadata may take other various forms as well.

In some implementations, the background images stored in background image database 112 may comprise a background image of a bag that was previously scanned. In some implementations, the background image may itself be simulated in part or in whole. For example, the simulation of an entire background image may encompass generating a 3-dimensional model of each item inside of an object and manipulating it in a manner similar to the manipulation of the target object.

F. Overlay Unit

Synthesis unit 108 may comprise software, hardware (e.g. CPUs or GPUs), firmware, or any combination thereof that may generate a synthesized image that combines an inputted simulated image and an inputted scanned image. Synthesis unit 108 may obtain the scanned image from background image database 112, and the simulated image from simulation unit 106.

At a high level, synthesis unit 108 may combine the pixel data of the simulated image with the pixel data of the background image to generate a combined, synthetic image. More particularly, synthesis unit first selects a location of the background image at which to insert the simulated image. Synthesis unit 108 may select this location in various manners.

After selecting the insertion location, synthesis unit 108 may combine the simulated image and the background image to generate the synthetic image. Once combined, synthesis unit may add further variation to the combined image Once synthesis unit has combined the background and simulated images, synthesis unit 108 may apply various variations to the combined image. The variations may take various forms. As examples, such variations may comprise changes in: intensity, obscuration, noise, magnification, rotation, and Z-effective encoding. For each type of variation, synthesis unit 108 may select a bound based on the variation parameters, and may randomly sample a parameter from this bound. As an example, the parameter bounds for rotation may be in a range of 1 to 360 degrees, and an angle may be randomly sampled from this bound.

In another implementation, synthesis unit 108 may learn the bounds of variation conditioned on a relevant image and the variation type, and may then randomly sample from the predicted bounds. The location of the background image at which the simulated image is injected may also be abstracted as a variation of type 'translation'. Similarly, bounds of the translation variation may be predefined and then randomly sampled from those bounds or the bounds can be predicted from a machine learning model and then randomly sampled from those bounds.

In another implementation, synthesis unit 108 may apply variations to the combined image that may comprise overlaying certain elements of the background image over the simulated image, and adapting the z-effective and density of the simulated image to match the background image. For example, if clothes or other low-density organic clutter are in the background of a background image such small "noise" may be overlaid onto the simulated image. If the background image contains high-density objects so as to make the background appear "black" to the user, then the part of the background image that is over said "black" portion may take on the same background due to the compounding nature of density on the ultimate x-ray penetrative ability at that point in space.

In another implementation, synthesis unit 108 may attempt to make the applied variations appear more realistic by parameterizing the variations. In an implementation, synthesis unit 108 may learn parameters of these variations using an adversarial framework. In this implementation, a generator model may learn parameters of the variation and a discriminator model may learn to distinguish between images having an injected image of a simulated object and images synthesized without any injected object image.

Synthesis unit 108 may apply various other variations and in various other manners as well.

G. Synthetic Image Database

Responsive to generating a synthetic image, synthesis unit 108 may output the generated synthetic image and any associated metadata to synthetic image database 114. In an implementation, synthetic image database 114 may comprise a database that stores synthetic images. In an implementation, Synthetic image database 114 may take a query as input, may process the query, and may output a synthetic image and any associated metadata for the outputted synthetic image on the inputted query. More particularly, synthetic image database 114 may be indexed using a key identifier for a given image type or object type. In various examples, synthetic image database 114 may be queried using a query language such as JSON, SQL or various other query languages. Synthetic image database 114 may be queried in various other manners as well. In another implementation, synthetic image database 114 may comprise a data store other than a database such as a flat file. Synthetic image database 114 may take various other forms as well.

II. Example Flow Diagram

Figure 6:
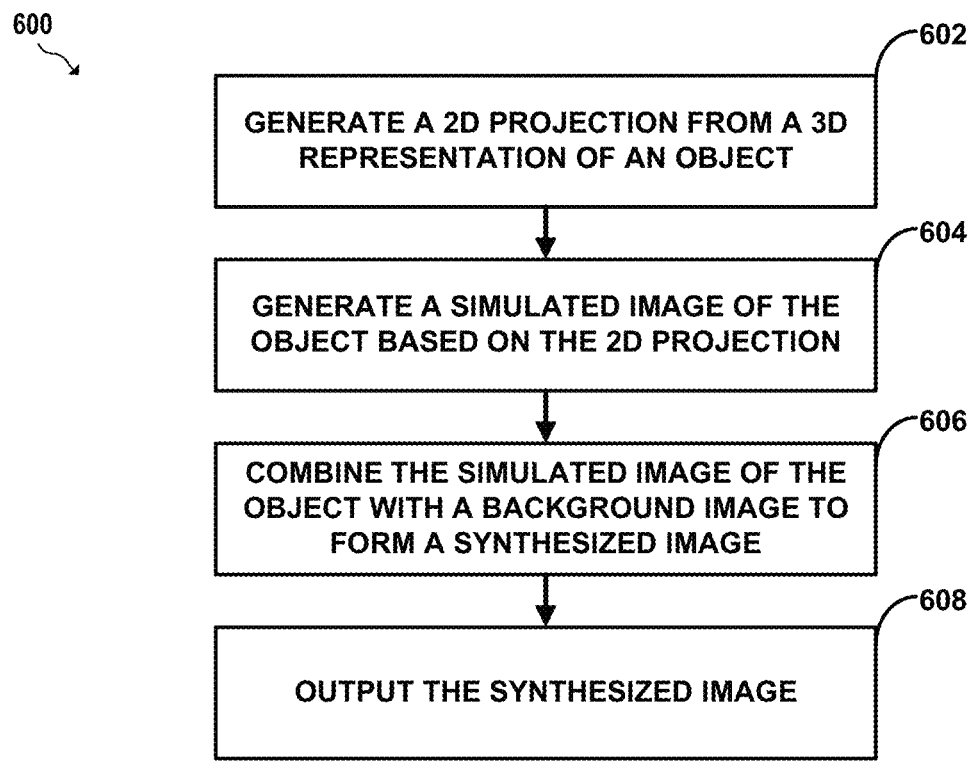
FIG. 6 is a flow diagram illustrating an example technique for generating synthetic image data.

FIG. 6 is a flow diagram illustrating an example method for generating synthetic images in accordance with techniques of this disclosure. FIG. 6 illustrates a method 600. Method 600 may be implemented as a method which may be executed by at least one processor, To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

By way of example, method 600 of FIG. 6 may be executed by system 100 of FIG. 1. System 100 may be implemented in hardware, software, microcode, firmware, on an application-specific integrated circuit (ASIC), read-only memory (ROM), field-programmable gate arrays (FPGAs) or any combination thereof. The method of FIG. 6 may be implemented in various other forms as well.

At block 602, projection unit 102 may generate a 2D projection from a 3D representation of an object.

At block 604, simulation unit 106 may generate, based on the projection, a simulated image of the object, wherein the simulated image appears as though the object has been scanned by a detection device.

At block 606, synthesis unit 108 may combine the simulated object with a background image to form a synthesized image, wherein the background image was captured by a detection device, and at block 608, overlay unit 108 may output the synthesized image.

III. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

What is claimed is:

1. A method for generating synthesized images performed by a computing system, the method comprising:
obtaining an image of a baggage item captured by a scanning device of a security system;
obtaining an image of an object;
generating, by a generative adversarial network (GAN) and based on the image of the object, a simulated image of the object such that the simulated image of the object comprises one or more image characteristics corresponding to one or more characteristics of images of the object that were captured by scanning devices;
generating a synthesized image based on the image of the baggage item and the simulated image of the object, wherein generating the synthesized image comprises:
selecting an insertion location within the baggage item in the image of the baggage item; and
inserting the simulated image of the object at the insertion location such that the simulated image of the object is within the baggage item in the image of the baggage item, thereby generating the synthesized image;
transforming at least one aspect of the simulated image of the object within the synthesized image in accordance with one or more aspects of the image of the baggage item, thereby generating a transformed synthesized image; and
after generating the transformed synthesized image, training an object detection algorithm with the transformed synthesized image.

2. The method of claim 1, wherein generating the synthesized image further comprises:
after inserting the simulated image of the object at the insertion location, adding one or more variations to the synthesized image, wherein adding the one or more variations comprises adding at least one of:
lighting, obscuration, illumination, or rotation to the simulated image of the object within the synthesized image.

3. The method of claim 1, wherein generating the simulated image of the object comprises:
determining a representation of the object in a three-dimensional (3D) virtual coordinate space; and
generating a two-dimensional (2D) slice from the 3D representation of the object.

4. The method of claim 1, wherein the image of the baggage item comprises at least one background object within the baggage item, and wherein transforming the at least one aspect of the simulated image of the object within the synthesized image comprises overlaying the simulated image of the object within the synthesized image with at least a portion of the at least one background object.

5. The method of claim 1, wherein selecting the insertion location within the baggage item in the image of the baggage item comprises determining an inside perimeter of the baggage item in the image of the baggage item; and wherein inserting the simulated image of the object at the insertion location such that the simulated image of the object is within the baggage item in the image of the baggage item comprises inserting the simulated image of the object at the insertion location such that the simulated image of the object is completely within the perimeter of the baggage item.

6. The method of claim 1, wherein the image of the baggage item comprises at least one of: spectral band data or material characteristics that correspond to pixel data of the image of the baggage item.

7. The method of claim 1, wherein transforming the at least one aspect of the simulated image of the object within the synthesized image comprises:
after generating the synthesized image:
inputting at least a portion of the synthesized image into a second GAN; and
matching, by the second GAN and based on the inputted at least portion of the synthesized image, at least one aspect of the at least portion of the synthesized image to match one or more aspects of the image of the baggage item.

8. A system for generating synthesized images, the system comprising:
at least one processor; and
a non-transitory computer-readable storage medium comprising instructions that are executable by the at least one processor to cause the system to:
obtain an image of a baggage item captured by a scanning device of a security system;
obtain an image of an object;
generate, by a generative adversarial network (GAN) and based on the image of the object, a simulated image of the object such that the simulated image of the object comprises one or more image characteristics corresponding to one or more characteristics of images of the object that were captured by scanning devices;
generate a synthesized image based on the image of the baggage item and the simulated image of the object, wherein to generate the synthesized image comprises:
selecting an insertion location within the baggage item in the image of the baggage item; and
inserting the simulated image of the object at the insertion location such that the simulated image of the object is within the baggage item in the image of the baggage item, thereby generating the synthesized image;
transform at least one aspect of the simulated image of the object within the synthesized image in accordance with one or more aspects of the image of the baggage item, thereby generating a transformed synthesized image; and
after generating the transformed synthesized image, train an object detection algorithm with the transformed synthesized image.

9. The system of claim 8, wherein the instructions that are executable by the at least one processor to cause the system to generate the synthesized image comprise instructions that are executable by the at least one processor to cause the system to:
after inserting the simulated image of the object at the insertion location, add one or more variations to the synthesized image, wherein adding the one or more variations comprises adding at least one of:
lighting, obscuration, illumination, or rotation to the simulated image of the object within the synthesized image.

10. The system of claim 8, wherein the instructions that are executable by the at least one processor to cause the system to generate the simulated image of the object comprise instructions that are executable by the at least one processor to cause the system to:
determine a representation of the object in a three-dimensional (3D) virtual coordinate space; and
generate a two-dimensional (2D) slice from the 3D representation of the object.

11. The system of claim 8, wherein the image of the baggage item comprises at least one background object within the baggage item, and wherein the instructions that are executable by the at least one processor to cause the system to transform the at least one aspect of the simulated image of the object within the synthesized image comprise instructions that are executable by the at least one processor to cause the system to overlay the simulated image of the object within the synthesized image with at least a portion of the at least one background object.

12. The system of claim 8, wherein selecting the insertion location within the baggage item in the image of the baggage item comprises determining an inside perimeter of the baggage item in the image of the baggage item; and wherein inserting the simulated image of the object at the insertion location such that the simulated image of the object is within the baggage item in the image of the baggage item comprises inserting the simulated image of the object at the insertion location such that the simulated image of the object is completely within the perimeter of the baggage item.

13. The system of claim 8, wherein the image of the baggage item comprises at least one of: spectral band data or material characteristics that correspond to pixel data of the image of the baggage item.

14. The system of claim 8, wherein the instructions that are executable by the at least one processor to cause the system to transform the at least one aspect of the simulated image of the object within the synthesized image comprise instructions that are executable by the at least one processor to cause the system to:
after generating the synthesized image:
input at least a portion of the synthesized image into a second GAN; and
match, by the second GAN and based on the inputted at least portion of the synthesized image, at least one aspect of the at least portion of the synthesized image to match one or more aspects of the image of the baggage item.

15. A non-transitory computer-readable storage medium comprising instructions that are executable by at least one processor to cause a computing system to:
obtain an image of a baggage item captured by a scanning device of a security system;
obtain an image of an object;
generate, by a generative adversarial network (GAN) and based on the image of the object, a simulated image of the object such that the simulated image of the object comprises one or more image characteristics corresponding to one or more characteristics of images of the object that were captured by scanning devices;
generate a synthesized image based on the image of the baggage item and the simulated image of the object, wherein to generate the synthesized image comprises:
selecting an insertion location within the baggage item in the image of the baggage item; and
inserting the simulated image of the object at the insertion location such that the simulated image of the object is within the baggage item in the image of the baggage item, thereby generating the synthesized image;
transform at least one aspect of the simulated image of the object within the synthesized image in accordance with one or more aspects of the image of the baggage item, thereby generating a transformed synthesized image; and
after generating the transformed synthesized image, train an object detection algorithm with the transformed synthesized image.

16. The non-transitory computer-readable storage medium of claim 15, wherein the instructions that are executable by the at least one processor to cause the system to generate the synthesized image comprise instructions that are executable by the at least one processor to cause the system to:
after inserting the simulated image of the object at the insertion location, add one or more variations to the synthesized image, wherein adding the one or more variations comprises adding at least one of:
lighting, obscuration, illumination, or rotation to the simulated image of the object within the synthesized image.

17. The non-transitory computer-readable storage medium of claim 15, wherein the instructions that are executable by the at least one processor to cause the system to generate the simulated image of the object comprise instructions that are executable by the at least one processor to cause the system to:
determine a representation of the object in a three-dimensional (3D) virtual coordinate space; and
generate a two-dimensional (2D) slice from the 3D representation of the object.

18. The non-transitory computer-readable storage medium of claim 15, wherein the image of the baggage item comprises at least one background object within the baggage item, and wherein the instructions that are executable by the at least one processor to cause the system to transform the at least one aspect of the simulated image of the object within the synthesized image comprise instructions that are executable by the at least one processor to cause the system to overlay the simulated image of the object within the synthesized image with at least a portion of the at least one background object.

19. The non-transitory computer-readable storage medium of claim 15, wherein selecting the insertion location within the baggage item in the image of the baggage item comprises determining an inside perimeter of the baggage item in the image of the baggage item; and wherein inserting the simulated image of the object at the insertion location such that the simulated image of the object is within the baggage item in the image of the baggage item comprises inserting the simulated image of the object at the insertion location such that the simulated image of the object is completely within the perimeter of the baggage item.

20. The non-transitory computer-readable storage medium of claim 15, wherein the instructions that are executable by the at least one processor to cause the system to transform the at least one aspect of the simulated image of the object within the synthesized image comprise instructions that are executable by the at least one processor to cause the system to:
after generating the synthesized image:
input at least a portion of the synthesized image into a second GAN; and
match, by the second GAN and based on the inputted at least portion of the synthesized image, at least one aspect of the at least portion of the synthesized image to match one or more aspects of the image of the baggage item.

* * * * *